Patented May 16, 1933

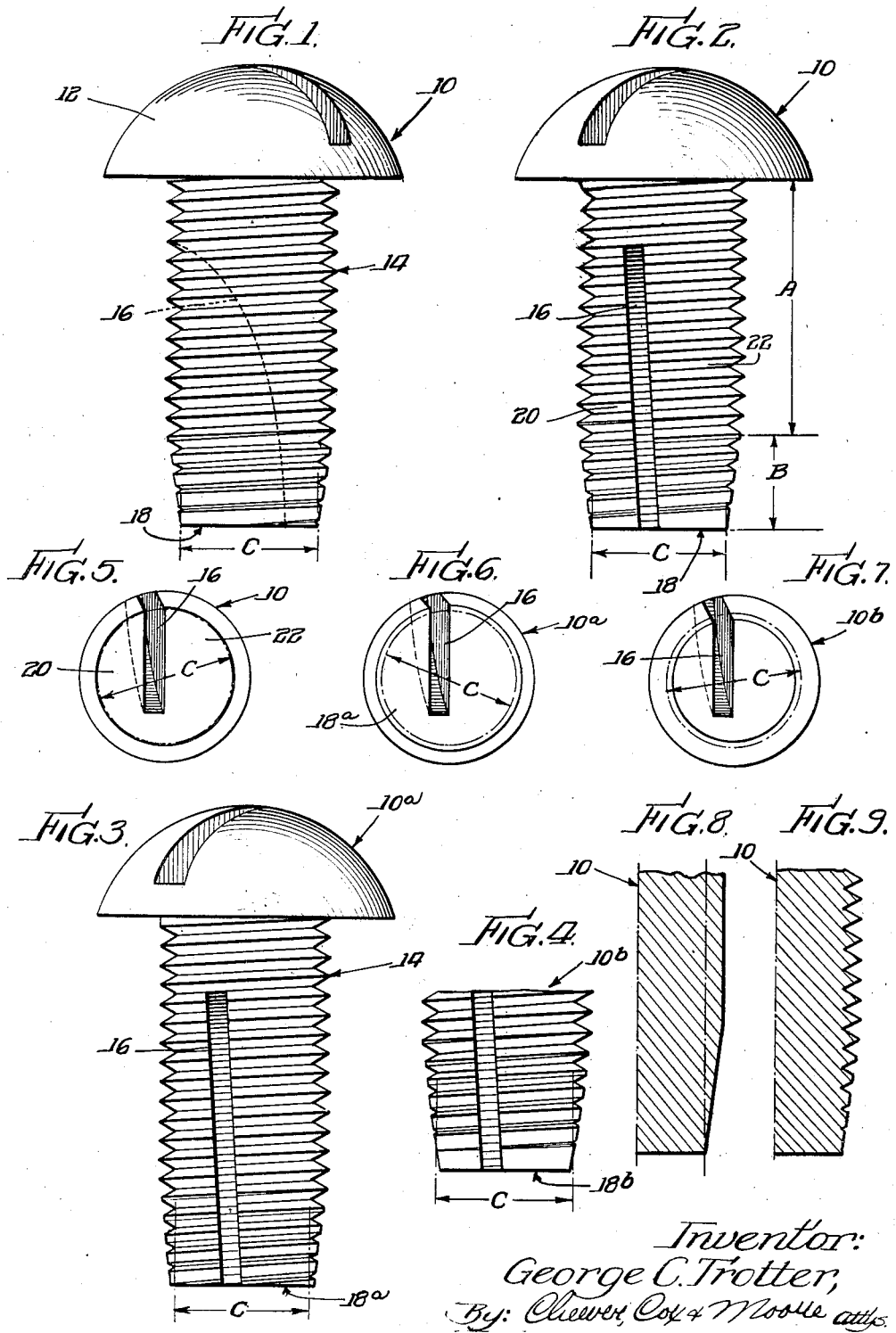

1,909,477

UNITED STATES PATENT OFFICE

GEORGE C. TROTTER, OF CHICAGO, ILLINOIS

TAPPING SCREW

Application filed February 6, 1932. Serial No. 591,273.

My invention relates generally to screw fasteners and more particularly to the type of screw commonly known as tapping screws which are adapted to cut their own complementary thread as they are turned within an unthreaded aperture of a work piece.

It is one of the primary objects of my present invention to provide a screw or fastener for relatively hard materials, such as metal, bakelite, etc., said screw having the body thereof so configurated or recessed as to facilitate the tapping action of the threads when the screw is inserted for fastening purposes within an unthreaded aperture, the threads at the entering end of the screw tapering to the screw extremity without experiencing variation in root diameter.

More specifically, my invention contemplates the provision of a tapping screw or fastener, as above set forth, which does not necessitate the use of a pilot at the entering end thereof, but contemplates the termination of the tapering screw threads at the screw extremity so that the diameter at said extremity will be substantially equal to the root diameter of the threads.

Still more specifically, my invention contemplates the provision of a screw which is longitudinally recessed so as to render at least one of the sections, separated by the recess, yieldable when the screw is initially inserted within a work piece, some of the screw threads tapering toward the entering end without varying in root diameter, said screw being provided with a non-burrowing end surface positioned adjacent the point where the screw threads vanish.

Another object of my invention is to provide a screw, as set forth above, in which the threads located in the vicinity of the entering end of the screw, are incomplete in the sense of tapering toward the entering end without varying in root diameter.

The foregoing and numerous other objects and advantages will be more apparent from the following detailed description when considered in connection with the accompanying drawing, wherein—

Figure 1 discloses an elevational view of a screw which is representative of one embodiment of my invention;

Figure 2 is also an elevational view of said screw as viewed from the left of Figure 1;

Figure 3 discloses in elevation a screw similar to the screw in Figures 1 and 2, the only exception being that the entering end of the screw has a diameter which is slightly larger than the root diameter of the screw threads;

Figure 4 discloses another modification in which the entering end of the screw has a diameter which is slightly less than the root diameter of the threads;

Figure 5 is a bottom view of the screws shown in Figures 1 and 2;

Figure 6 is a bottom view of the screw shown in Figure 3;

Figure 7 is a bottom view of the screw in Figure 4; and

Figures 8 and 9 illustrate the manner in which the threads of my improved screw or fastener are rolled or otherwise formed within a blank which originally is provided with a tapered end, as clearly shown in Figure 8.

Referring now to the drawing more in detail wherein like numerals have been employed to designate similar parts throughout the various figures, it will be seen that one embodiment of my invention, as shown in Figures 1 and 2, contemplates a screw or fastener designated by the numeral 10. This screw includes a head 12 and a screw body 14 formed integral therewith, said screw body being preferably hardened and provided with a recess or slot 16 extending partially through the screw body and disposed at substantially right angles with respect to the thread helix, as clearly shown in Figure 2.

It will be noted that the portion of the screw body 14 over the distance designated by the letter A, Figure 2, includes threads of uniform height, while the threads extending along the distance designated by the letter B, taper or reduce in height until they actually vanish at the entering end surface 18. The diameter of the surface 18 indicated by the letter C is equal to the root diameter of the threads and, as will be more clearly apparent in Figure 1, the entering thread portion fades or vanishes as it reaches the surface 18. It will, therefore, be apparent that the threads in the screws of Figures 1 and 2 have a uniform root diameter C, and that over the distance B the threads are incomplete in the sense of tapering toward the entering surface 18 without varying in root diameter.

The slot or recess 16 divides the screw into two screw sections 20 and 22. When the screw is turned within the unthreaded aperture of a work piece, the section 20 will yield sufficiently to enhance the cutting action of the edges determined by the threads in the section 22. For a more detailed explanation of the functional characteristics of these screw sections, reference is made to my co-pending application, Serial No. 551,904, filed July 20, 1931. For a clear understanding of the present invention it will suffice to say that the provision of a recess in the screw body serves to greatly facilitate the forming of the threads within the work piece, and by having the recess 16 disposed substantially perpendicular to the thread helix of the screw, the alinement of the threads in the sections 20 and 22 is maintained regardless of the shifting of one section with respect to the other when the screw is being turned within a work piece.

While the threads at the entering extremity of the screw are incomplete, it will be observed that, when the initial cut in the work piece is made by the threads, this cut is substantially light, and hence serves to effectively guide or lead the next following thread portions of increased height with a minimum amount of turning force. That is to say, the tapering of the threads in the manner shown, coupled with the slotted arrangement of the screw body, causes the screw to effect an initial thread forming action within the work piece with a minimum amount of turning torque and without the danger of canting. I prefer to pre-form the holes or apertures in the work piece with a diameter slightly in excess of the root diameter so as to still further expedite the initial application or insertion of the screw. This form of screw or fastener should be distinguished from fasteners in which substantial pilot sections are provided at the entering end of the screw to enable the threads in the screw to initially "take" within the work piece. My invention enables a screw equipped with standard machine screw threads to be very effectively employed as a fastening means in instances where it is not desirable to tap an aperture prior to the insertion of the screw.

While in Figures 1, 2, and 5 I have disclosed a tapping screw in which the entering end surface 18 is exactly equal to the root diameter, it should be understood that screws of slightly modified form, as shown in Figures 3 and 4, may be employed without departing from the spirit and scope of my invention. In Figure 3 I have shown a screw indicated by the numeral 10a, which is practically identical with the screw 10, with the exception that the diameter of the entering end surface designated by the numeral 18a, although substantially equal to the root diameter, is, in fact, slightly larger. This form of screw is merely shown for the purpose of illustrating the fact that my invention is not limited to a screw in which the diameter of the entering end surface is exactly equal to the root diameter, but contemplates screws in which said diameter is substantially equal to the root diameter. The screw 10a may be employed in instances where the formation of a complete thread within the unthreaded aperture of a work piece is not necessitated in order to render the screw effective as a fastener. In other words, the screw is particularly adaptable to be used in instances where the unthreaded aperture is larger in diameter than the root diameter of the screw threads. In Figure 6 I have disclosed a bottom view of the screw 10a, and for the purpose of illustration have somewhat exaggerated the difference in diameters of the entering end surface 18a and the root diameter C.

In Figure 4 I have shown a screw designated by the numeral 10b, which is similar to the screws 10 and 10a, differing only therefrom in that the diameter of the entering end surface 18b is a trifle less than the root diameter. In all of the modifications disclosed in the drawing I have shown screws in which the entering end surface is substantially equal in diameter to the root diameter of the threads, and said threads vanish or terminate at a point adjacent said end surface. In other words, a screw constructed in accordance with the teachings of my invention need not be provided with a pilot in order to render the screw effective as a tapping screw, but need only be provided with a thread taper of the type disclosed.

In the manufacture of screws of the type shown in the drawing, conventional thread rolling methods are employed. In Figure 8 I have shown one-half of a complete screw blank in section to illustrate that previous to the forming of the threads in the blank, the entering end is provided with the desired taper, and that the diameter of the circular surface which defines the entering end of the taper, is substantially equal in diameter to the root diameter of the threads later to be rolled or otherwise formed in the blank. In Figure 9 I have shown a similar section as it would appear after the threads are rolled or cut in the blank of Figure 8. Thread rolling processes have been known for many years, and, as an example of one method of thread rolling or forming which may be employed, we make reference to the early patent to Rogers, No. 434,809, of August 19, 1890, and also the early patent to J. Sheldon, No. 498,582, of May 30, 1893.

From the foregoing it will be apparent that my invention contemplates an improved tapping screw which is extremely simple in construction and easy to manufacture. The fact that the screw is provided with the thread and slot arrangement as shown, coupled with the tapered thread construction, enables the screw to be effectively employed in securing relatively thick work pieces together, as distinguished from conventional types of screws, commonly referred to as self-tapping screws, which are particularly adapted to be used only in securing metallic sheets together. My improved screw is adapted to gradually cut its way into the work piece and finally form a complete complementary thread therein. Said screw may be applied with a minimum amount of turning effort by reason of its tapered thread and recessed construction. It should be noted that the slot or recess 16 is sufficiently wide to accommodate chips produced during the tapping operation of the screw, thereby enabling the advancing screw section to maintain its resiliency regardless of the collection of chips within the recess.

Having thus described my invention, what I claim as new and desire to secure by Letters Patent is:

A thread cutting fastener including a hardened threaded body portion, said body including a section having a cutting edge and a yieldable section for increasing the cutting effectiveness of the edge on said other section, the diameter of the thread decreasing toward the entering end of the fastener, said thread terminating at the entering extremity of said body.

In witness whereof, I have hereunto subscribed my name.

GEORGE C. TROTTER.